Patented Apr. 24, 1945

2,374,327

UNITED STATES PATENT OFFICE 2,374,327

ESTERS OF γ-ACETYL-γ-METHYL-PIMELIC ACID

Herman A. Bruson, Philadelphia, Pa., assignor to The Resinous Products & Chemical Company, Philadelphia, Pa., a corporation of Delaware No Drawing. Application February 28, 1942, Serial No. 432,804

6 Claims. (Cl. 260—483)

This invention relates to esters of saturated monohydric alcohols and γ-acetyl-γ-methyl-pimelic acid, said esters being new compounds having the formula

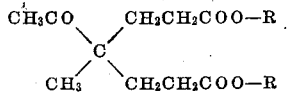

wherein R is the organic radical of a saturated monohydric alcohol.

These esters are obtained by heating a monohydric saturated alcohol with γ-acetyl-γ-methyl-pimelic acid, advantageously in the presence of acidic catalysts which promote the esterification, such as sulfuric acid, benzene sulfonic acid, alum, zinc chloride, metaphosphoric acid, and the like, according to well-known methods, and allowing the water to distil off as rapidly as formed.

The γ-acetyl-γ-methyl-pimelic acid is a new crystalline organic acid melting at 125° C., obtainable by condensing methyl ethyl ketone with acrylonitrile in the presence of potassium hydroxide as a catalyst, and hydrolyzing the γ-acetyl-γ-methyl-pimelonitrile which is formed, as described in my co-pending patent application Serial No. 414,598, filed October 11, 1941, which, on February 22, 1944, issued as U. S. Patent No. 2,342,606.

The following examples illustrate this invention:

Example 1

A mixture of 252 parts of γ-acetyl-γ-methyl-pimelic acid, 220 parts of n-butanol, 322 parts of toluene, and 2 parts of 98% sulfuric acid was boiled in a vessel fitted with a reflux condenser to which a water trap was attached. After about 4 hours' boiling, water ceased coming over. The product was cooled, washed with water and soda solution, dried, and distilled. After the toluene and excess butanol were removed, the residual oil was distilled under reduced pressure. The di-butyl ester of γ-acetyl-γ-methyl-pimelic acid came over at 190-195° C./1-2 mm. in a yield of 320 parts, or 92%. It is a colorless oil and an excellent plasticizer for polyvinyl chloride.

Example 2

A mixture of 280 parts of γ-acetyl-γ-methyl-pimelic acid, 200 parts of 95% ethanol, 200 parts of benzene, and 3 parts of 98% sulfuric acid was boiled under a reflux condenser attached to a water trap for about 10 hours until no more droplets of water came over with the benzene. The excess benzene and alcohol were removed by distillation, and the residue was distilled under reduced pressure. The di-ethyl ester of γ-acetyl-γ-methyl-pimelic acid distilled over at 160-170°/1-2 mm. in a yield of 205 parts. Upon redistillation at 10 mm., it distils at 190° C./2 mm. as a colorless oil.

Example 3

A mixture of 108 parts of γ-acetyl-γ-methyl-pimelic acid, 150 parts of methanol, and 2 parts of 98% sulfuric acid was boiled under reflux for 4 hours. The excess methanol together with the water formed was then distilled off. Fresh methanol (200 parts) was then added and the mixture was boiled for 3 hours. The excess methanol together with the water formed was again distilled off. The residual oil was cooled, washed with water and soda solution, dried, and distilled in vacuo. The di-methyl ester of γ-acetyl-γ-methyl-pimelic acid was obtained as a colorless oil, boiling at 182-184° C./11 mm. in a yield of 80 parts.

Example 4

A mixture of 297 parts of γ-acetyl-γ-methyl-pimelic acid, 240 parts of isopropanol, 240 parts of benzene, and 2 parts of 98% sulfuric acid was boiled under a reflux condenser attached to a water trap until no more water came over with the benzene, about 15 hours being required. The excess isopropanol and benzene were distilled off, and the residual oil was cooled, washed with water and soda solution, dried, and distilled under reduced pressure. The di-isopropyl ester of γ-acetyl-γ-methyl-pimelic acid distilled over at 155-160° C./1 mm. as a colorless oil in a yield of 333 parts.

Example 5

A mixture of 108 parts of γ-acetyl-γ-methyl-pimelic acid, 180 parts of glycol monoethyl ether ("Cellosolve"), and 1 part of 98% sulfuric acid was boiled under reflux for 8 hours. The product was cooled, washed with water, taken up in toluene, washed with dilute soda solution, dried and distilled. The ester having the formula

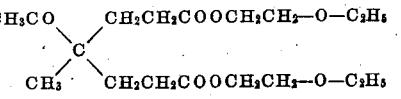

distilled over at 220-225° C./3 mm. as a colorless oil.

Example 6

A mixture of 108 parts of γ-acetyl-γ-methyl-pimelic acid, 260 parts of octanol-2 (capryl alcohol), 260 parts of toluene, and 5 parts of 98% sulfuric acid was boiled under a reflux condenser attached to a water trap for 4 hours until no more water came over. The product was cooled, washed thoroughly with water and with dilute soda solution, dried, and evaporated to dryness. The excess octanol-2 was distilled off in vacuo, leaving a residual oil which was heated to 160° C. at 1 mm. pressure to remove traces of octanol-2. The di-capryl ester of γ-acetyl-γ-methyl-pimelic acid thus obtained was an amber-colored oil weighing 160 grams. It could not be distilled except in small quantities even under a reduced pressure as low as 1 mm. without decomposition because of its extremely high boiling point. Analysis showed a saponification number of 258 (theory 256).

In a similar manner, the α-ethyl hexyl, as well as the decyl and dodecyl esters of γ-acetyl-γ-methyl-pimelic acid are obtained as high boiling liquids. These can be bleached, if desired, by clays or carbon to a pale yellow color.

*Example 7*

A mixture of 43 parts of γ-acetyl-γ-methyl-pimelic acid, 200 parts of benzyl alcohol, and 110 parts of xylene was boiled under reflux attached to a water separator until water ceased coming over, 10 hours being required. The product was cooled, washed with water and with dilute soda solution, dried, and heated under 1 mm. pressure to a temperature of 195° C. The residual dibenzyl ester of γ-acetyl-γ-methyl-pimelic acid, weighing 52 grams, was an amber-colored thick oil.

In the same manner, the di-(p-chloro-benzyl) ester may be obtained as a viscous oil.

*Example 8*

A mixture of 108 parts of γ-acetyl-γ-methyl-pimelic acid, 200 parts of cyclohexanol, 200 parts of toluene, and 1 part of 98% sulfuric acid was boiled for 4 hours until 19 parts of water had collected in the water trap attached to the reflux condenser. The product was cooled, washed with water and with soda solution, and dried. All volatile material, including the residual cyclohexanol, was removed by heating under 1 mm. pressure to a temperature of 195° C. The di-cyclohexyl ester of γ-acetyl-γ-methyl-pimelic acid was obtained in a yield of 203 parts. It solidified on standing to a solid waxy mass of crystals.

*Example 9*

A mixture of 1 mol equivalent of γ-acetyl-γ-methyl-pimelic acid, 3 mols of tetrahydro furfuryl alcohol, and 1% by weight of 98% sulfuric acid was boiled in the presence of toluene until no more water separated in a reflux condenser water trap. The product was cooled, washed with water containing a little lime, and filtered. The filtrate was evaporated to dryness under a pressure of 1 mm. at a bath temperature of 190° C. to give a residual oil, which was the di-tetrahydro furfuryl ester of γ-acetyl-γ-methyl-pimelic acid. This product boiled at 250–255° C./2 mm.

These esters of saturated monohydric alcohols and γ-acetyl-γ-methyl-pimelic acid are valuable as plasticizers or softening agents for a wide variety of organic polymeric resins, such as polyvinyl chloride, polyvinylidene chloride, esters and ethers of polyvinyl alcohol, esters of polyacrylic and polymethacrylic acids, cellulose esters and ethers, polystyrene, synthetic rubbers, chlorinated or hydrochlorinated rubber, phenolic-formaldehyde resins, and the like. These esters are of particular value because of their wide range of compatibility as well as their resistance to freezing, oxidation, moisture, and evaporation. The compounds in which R represents relatively short chain alkyl groups (methyl, ethyl, propyl, isopropyl, butyl, isobutyl, sec-butyl, isoamyl, sec-amyl, α-ethyl butyl, sec-octyl, α-ethyl hexyl) are of particular value as plasticizers for nitrocellulose, phenolic-formaldehyde resins, polymethyl methacrylate and polyvinyl chloride. When R represents the organic radical of an ether alcohol such as the tetrahydrofurfuryl, β-methoxy-ethyl, β-ethoxy-ethyl, or β-butoxy-ethyl group, then the esters are particularly valuable for plasticizing cellulose acetate, ethyl cellulose and cellulose acetate-butyrate. Finally, when R represents a cycloalkyl group, such as cyclohexyl, cyclopentyl, or methyl-cyclohexyl, an aralkyl group, such as benzyl, o-chlorobenzyl, p-chloro-benzyl, or long chain alkyl group having from 8 to 18 carbon atoms in the alkyl chain, the esters are useful for softening synthetic rubbers, polystyrene, and chlorinated rubber.

I claim:

1. As a new compound, an ester having the formula:

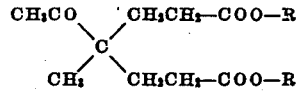

wherein R is the organic radical of a saturated monohydric alcohol.

2. As a new compound, an ester having the formula:

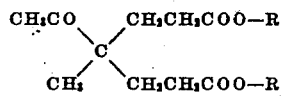

wherein R is the organic radical of a saturated aliphatic monohydric alcohol.

3. As a new compound, an ester having the formula:

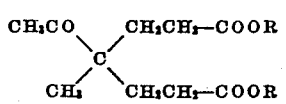

wherein R is a saturated alkyl group.

4. As a new compound, the di-n-butyl ester of γ-acetyl-γ-methyl-pimelic acid.

5. As a new compound, the di-isopropyl ester of γ-acetyl-γ-methyl-pimelic acid.

6. As a new compound, the di-ethyl ester of γ-acetyl-γ-methyl-pimelic acid.

HERMAN A. BRUSON.